United States Patent [19]
Goldner et al.

[11] Patent Number: 5,973,783
[45] Date of Patent: Oct. 26, 1999

[54] FIBER OPTIC GYROSCOPE COIL LEAD DRESSING AND METHOD FOR FORMING THE SAME

[75] Inventors: Eric Lee Goldner, Valencia; Thomas McLean; Amado Cordova, both of Woodland Hills, all of Calif.; Kenneth Bean, Riverton; Arthur D. Lang, Park City, both of Utah

[73] Assignee: Litton Systems, Inc., Woodland Hills, Calif.

[21] Appl. No.: 09/127,490

[22] Filed: Jul. 31, 1998

[51] Int. Cl.⁶ .................................................... G01C 19/72
[52] U.S. Cl. .............................................................. 356/350
[58] Field of Search ................................... 356/350, 345; 250/227.19, 227.27; 385/12, 14; 242/174

[56] References Cited

FOREIGN PATENT DOCUMENTS

0169714  7/1986  Japan ...................................... 356/350

*Primary Examiner*—Samuel A. Turner
*Attorney, Agent, or Firm*—Price, Gess & Ubell

[57] ABSTRACT

An improved dressing for the fiber optic leads of a fiber optic gyroscope sensing coil and method for forming the same. A pair of fiber optic leads connect the sensing coil of a rotation sensing device to an integrated optics chip. The fiber optic leads are originally arranged to extend around the fiber optic sensing coil in different directions. The leads are formed of unequal lengths, where the longer of the leads is extended along an outer circumference of the sensing coil. The longer lead is bent so that the circumferential direction of longer lead reverses itself, and the longer lead then extends around the sensing coil in the same direction as the shorter lead. A low modulus adhesive is applied to the leads and cured to initially bond the leads in place against the sensing coil. The pair of leads are then wound in the same circumferential direction adjacent to each other fashion around the outer circumference of the sensing coil. After the desired amount of winding has been completed, a predetermined length of each of the leads is left available to be routed to the rotation sensing device. The entire outer surface of the wound fiber optic leads surrounding the temporary adhesion is then coated with a low modulus adhesive and cured to bond the wound leads against the sensing coil structure.

20 Claims, 5 Drawing Sheets

FIG. 5

FIBER OPTIC GYROSCOPE COIL LEAD DRESSING AND METHOD FOR FORMING THE SAME

BACKGROUND OF THE INVENTION

1. Field of the Invention

The present invention relates generally to a fiber optic gyroscope, and specifically to an improved dressing for the leads of a fiber optic gyroscope sensing coil.

2. Description of Related Art

Fiber optic gyroscopes are used to measure the rate of rotation of a particular vehicle or platform. In order to measure the rotation of a fiber optic gyroscope, often counter-propagating waves are input through fiber optic leads attached to a fiber optic sensing coil. A phase shift between the counter-propagating waves develops as a result of the rotation of the fiber optic sensing coil. The fiber optic leads extend from the fiber optic sensing coil to a device, such as an integrated optics chip, for measuring the relative phase difference between the waves.

There have been various dressing techniques attempted in the past for attaching the fiber optic leads to the fiber optic sensing coil. Usually, these dressing techniques have included some form of bonding, such as the use of adhesive tape or transfer adhesive. These prior bonding techniques generally either failed to provide enough support for the leads or used an adhesive having too high of a modulus of elasticity, which can cause strain-induced bias errors in the gyroscope output. It is often necessary to remove the fiber optic leads from their attachment to the fiber optic sensing coil to perform troubleshooting. When a defect occurs in the fiber optic leads or the fiber optic sensing coil, the bond between leads and the fiber optic sensing coil needs to be broken so that the fiber optic leads can be removed and reworked. An adhesive having too high of a modulus of elasticity precludes removal of the fiber optic leads without damage to the jacket of the leads or to the sensing coil fiber.

Further, various environmental conditions and vibrations confronted by the fiber optic sensing coil over time impute a stress on the fiber optic leads. When a high modulus adhesive is used to affix the fiber optic leads to the sensing coil, the leads are rigidly retained against the sensing coil and prevented from moving relative to the sensing coil. Any imputed stress on the sensing coil structure is then exerted on the leads themselves. This stress on the leads causes their shape to distort, where even the slightest deviation in shape affects the wavelength propagation characteristics of the fiber optic leads.

Clearly, there is a need for an improved dressing for the fiber optic leads of a fiber optic gyroscope sensing coil which allows the fiber optic gyroscope to function consistently over a variety of environmental conditions. Moreover, there is a need or an improved dressing for the fiber optic leads of a fiber optic gyroscope sensing coil which stably retains the fiber optic leads in position against the fiber optic sensing coil while allowing the fiber optic leads to be repeatedly reworked without damaging either the leads or the sensing coil.

SUMMARY OF THE INVENTION

It is a primary object of the present invention to overcome the aforementioned shortcomings associated with the prior art.

The present invention provides an improved dressing for the leads of a fiber optic gyroscope sensing coil which allows the attachment of the leads to the fiber optic gyroscope to be repeatedly reworked without damaging either the leads or the fiber optic sensing coil.

The present invention further provides an improved dressing for the leads of a fiber optic gyroscope sensing coil which allows the fiber optic gyroscope to function consistently over a variety of environmental conditions.

These as well as additional advantages of the present invention are achieved by providing an improved dressing for the fiber optic leads of a fiber optic gyroscope sensing coil and method for forming the same. A pair of fiber optic leads connect the sensing coil to an integrated optics chip. The sensing coil is cylindrical in shape, where the fiber optic leads are originally arranged to extend around an outer circumference of the fiber optic sensing coil in opposite directions, one extending clockwise from a starting point on the sensing coil and the other one counter-clockwise. The leads are formed of unequal lengths. The longer lead is bent so that the circumferential direction of longer lead reverses itself, and the longer lead then extends around the outer circumference of the sensing coil in the same circumferential direction as the shorter lead.

The bent portion of the longer lead is temporarily adhered to the sensing coil using an adhesive tape. A low modulus adhesive is applied to the regions of the leads surrounding the adhesive tape and cured in order to bond these fiber segments in place to the sensing coil. The adhesive tape is then removed, and the low modulus adhesive is applied and cured in the region where the adhesive tape was located. The pair of leads are then wound together in the same direction in adjacent fashion around the outer circumference of the sensing coil. After the desired amount of winding has been completed, a predetermined length of each of the leads is left available to be routed to the integrated optic chip. Adhesive tape is again applied to the fiber optic leads at a point where the leads extend away from the surface of the sensing coil. The entire outer diameter of the wound fiber optic leads surrounding the temporary adhesive is then coated with a low modulus adhesive and cured. The adhesive tape is removed, and the low modulus adhesive is applied and cured in the region from where the temporary adhesive was just removed.

The improved dressing for the fiber optic leads of a fiber optic gyroscope sensing coil of the present invention provides an environmentally stable connection having a low bias error over fluctuations in temperature and other external conditions. Further, shock and vibration performance of the sensing coil is not compromised, since the low modulus adhesive bonding allows some relative movement between the leads and the sensing coil in order to minimize the stress imparted on the leads. Additionally, rework of the fiber optic leads is easily achieved, since the fiber optic leads can be peeled through the low modulus adhesive without damaging the leads or the sensing coil.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved dressing for the fiber optic leads of a fiber optic gyroscope sensing coil and a method for forming the same.

Figure 1:
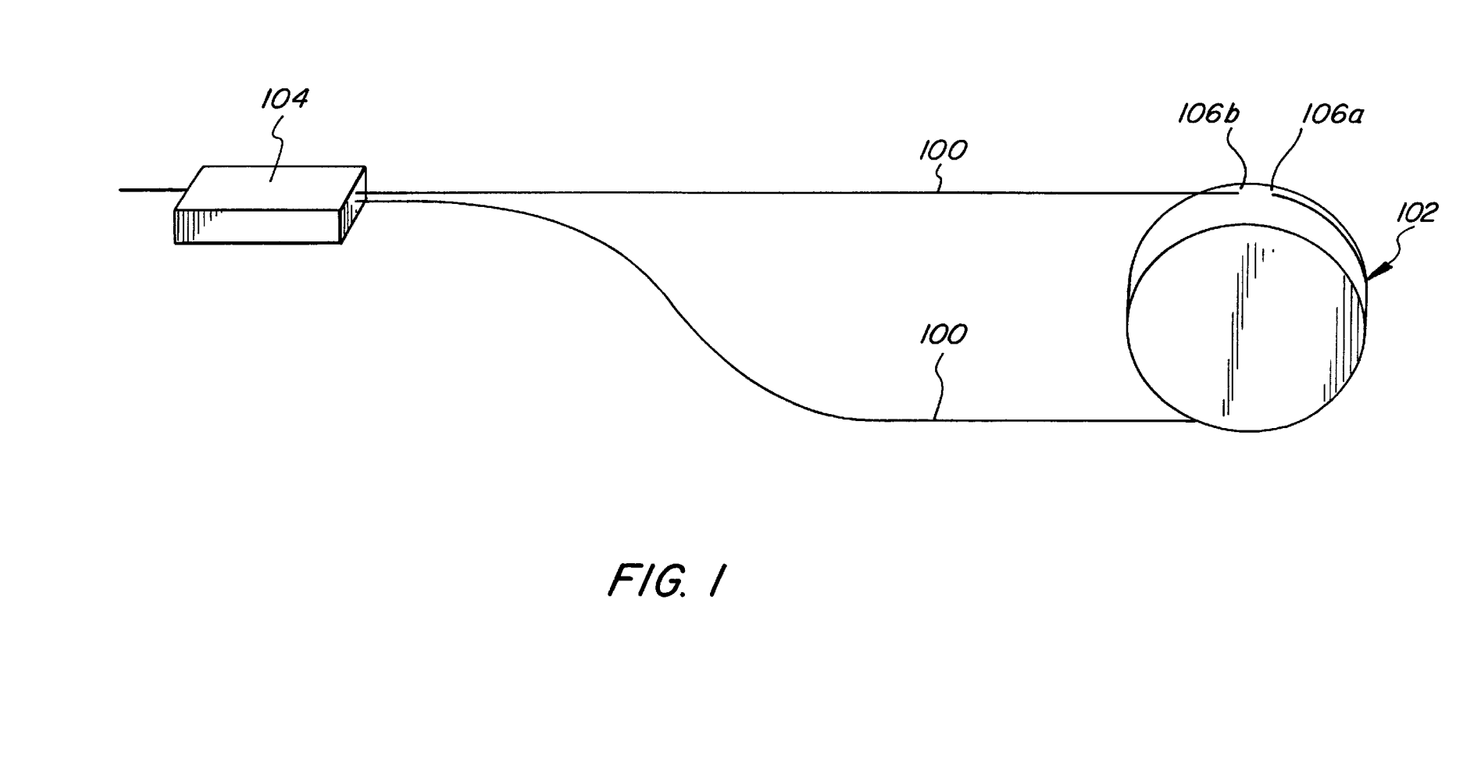
FIG. 1 is a perspective view of the initial connection between a fiber optic gyroscope sensing coil and an integrated optics chip through the fiber optic leads of a preferred embodiment of the present invention.

The present invention is directed to an improved dressing for a pair of fiber optic leads 100 of a fiber optic gyroscope sensing coil 102, as illustrated in FIG. 1. The pair of fiber optic leads 100 connect the sensing coil 102 to an integrated optics chip 104. The integrated optic chip 104 may be comprised of a Y-junction coupler or polarizer and a phase modulator, or other similar devices capable of measuring relative phase shifts between counter-propagating waves which propagate through the fiber optic leads 100. A phase shift between the counter-propagating waves develops as a result of the rotation of the fiber optic sensing coil 102, and the waves recombine coherently at the integrated optics chip 104 as an intensity signal proportional to the sensed rotation rate. The leads 100 may either pigtail directly into the integrated optics chip 104 or may be spliced with leads extending from the integrated optics chip 104.

Figure 2:
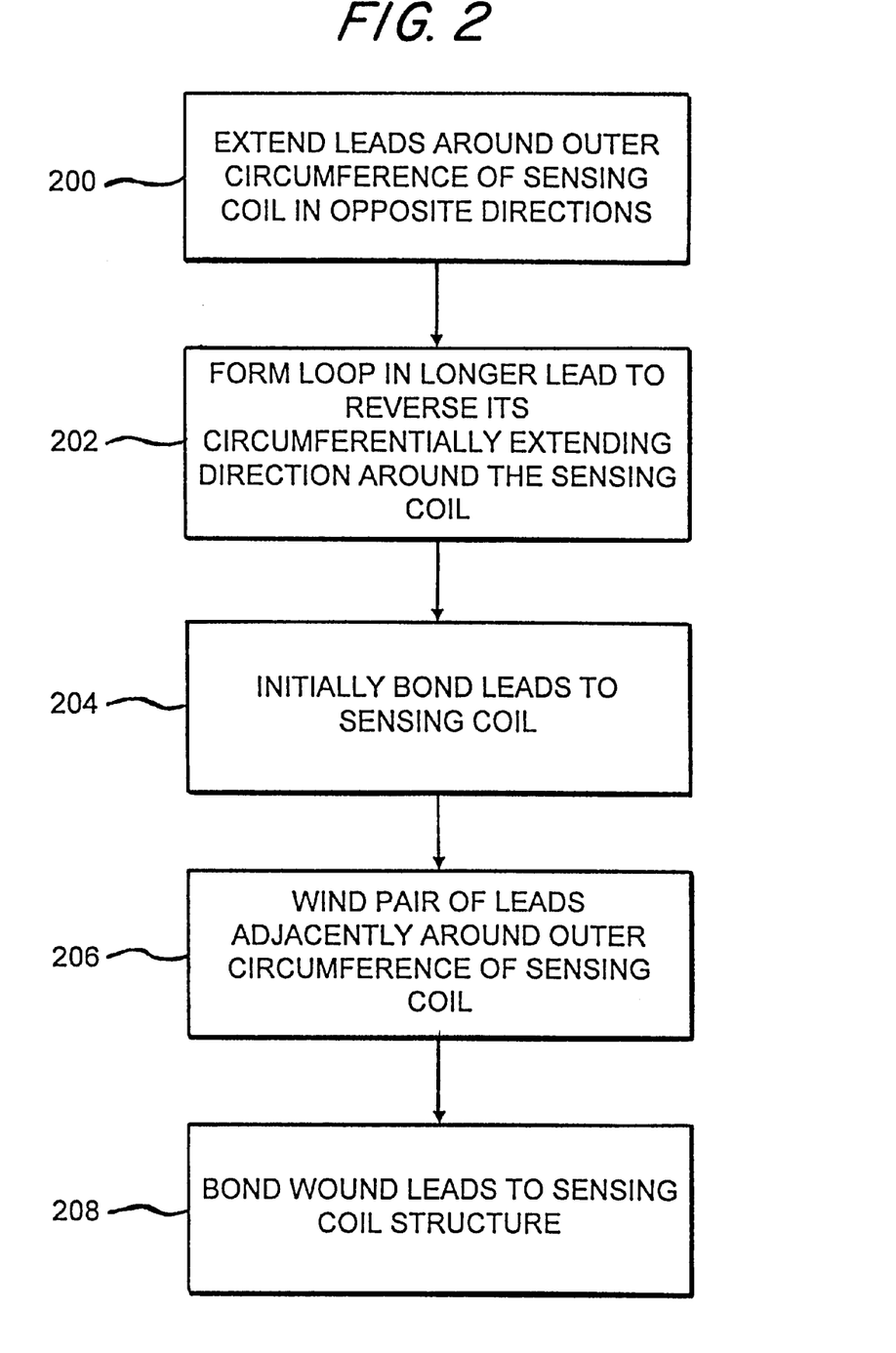
FIG. 2 is an operational block diagram of the method of dressing the fiber optic leads of a fiber optic sensing coil in accordance with a preferred embodiment of the present invention.
Figure 3A:
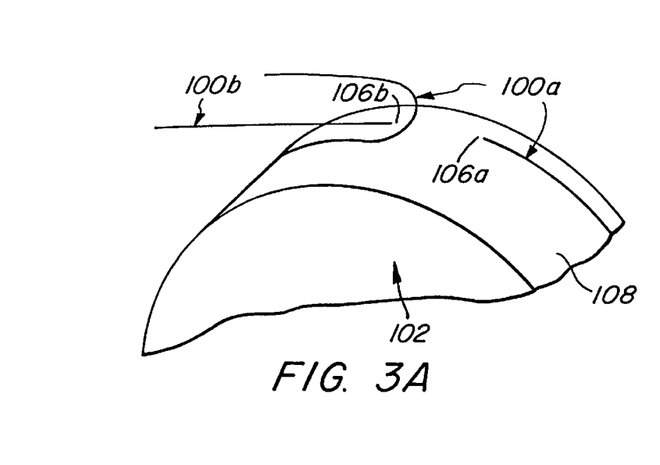
FIG. 3A is a partial enlarged perspective view of the initial positioning of the fiber optic leads with respect to the fiber optic sensing coil of FIG. 1.
Figure 3B:
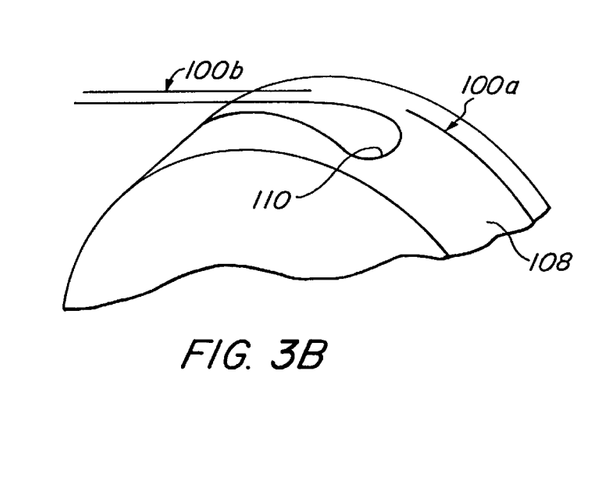
FIG. 3B is a partial enlarged perspective view of a loop being formed in one of the fiber optic leads against to the fiber optic sensing coil of FIG. 3A.

The lead dressing is the manner in which the fiber optic leads 100 are attached to the sensing coil 102. Referring now to FIG. 2, the method of dressing the fiber optic leads 100 of the sensing coil 102 in accordance with a preferred embodiment of the present invention is illustrated in an operational block diagram. This method will be described with further reference to FIGS. 3A–3D, which illustrate perspective views of the fiber optic leads 100 attachment to the sensing coil 102 during the progression of dressing the fiber optic leads 100. The pair of leads 100 comprise a longer lead 100a and a shorter lead 100b. Initially in step 200, respective ends 106a and 106b of each of the leads 100a and 100b are positioned on the surface of the sensing coil 102. The leads 100a and 100b are then arranged to extend from their respective ends 106a and 106b around the sensing coil 102 in different directions, one of the leads 100a extending clockwise around the sensing coil 102 and the other of the leads 100b extending counterclockwise. The leads 100a and 100b are formed of unequal lengths, so that lead 100a is extended along an outer circumference 108 of the sensing coil 102, as shown in FIG. 3B.

In step 202, lead 100a is bent so that the circumferential direction of lead 100a is reversed. As illustrated in FIG. 3B, lead 100a originally extends in a clockwise direction around the outer circumference 108 of the sensing coil and is bent to form a loop 110 in lead 100a to reverse the circumferential direction of lead 100a to extend counter-clockwise, such that the remaining lengths of the leads 100a and 100b to the integrated optics chip 104 will thereinafter be the same. The curvature of the loop 110 is formed to reverse the direction of lead 100a as quickly as possible while minimizing the bending losses and polarization effects which can result from bending an optical fiber. The curvature and location of the loop 110 is also formed such that both of the leads 100a and 100b will be the same length after the loop 110 as they extend to the integrated optic chip 104. After reversing the direction of the longer lead 100a, the longer lead 100a then extends around the sensing coil 102 in the same circumferential direction as the shorter lead 110b. It is understood that the original respective circumferential directions of the leads 100a and 100b are not critical, as long as the leads 100a and 100b originally extend in opposite circumferential directions from each other around the sensing coil 102.

The leads 100 are initially bonded to the sensing coil 102 in step 204 using an adhesive having a low modulus of elasticity, i.e. less than approximately 500 psi. In the preferred embodiment of the present invention, a low-modulus UV-curing adhesive, such as Q3-6662 silicone manufactured by Dow Corning, is applied over the leads 100 and cured. UV-curing adhesives provide a cost-effective, easily implemented, and efficient manner of bonding the leads 100 to the sensing coil 102, as these adhesives can be quickly and easily cured using a UV-light source. However, it is understood that the adhesive used to bond the leads 100 to the sensing coil 102 could be any type of low modulus adhesive capable of being cured in other manners, such as time-curing, moisture-curing or thermal-curing adhesives. The process performed in step 204 of bonding the leads 100 to the sensing coil 102 will be later described in greater detail with reference to the operational block diagram of FIG. 4.

In step 206, the pair of leads 100 are then wound in the same circumferential direction adjacent to each other around the outer circumference 108 of the sensing coil 102. After the desired amount of winding has been completed, a predetermined length 112 of each of the leads 100 is left available to be routed to the integrated optics chip 104. The wound portion of the leads 100 are then bonded to the sensing coil 102 structure in step 208 using a low modulus adhesive similar to the low modulus adhesive used in step 204. The process performed in step 208 of finally bonding the wound portion of the leads 100 to the sensing coil 102 structure will be later described in greater detail with reference to operational block diagram of FIG. 5.

By dressing the fiber optic leads 100 of the sensing coil 102 in accordance with the method of the present invention, the leads 100 are wound as a pair substantially adjacent to each other throughout the winding. This arrangement provides an environmentally stable gyroscope sensing coil 102 structure having a low bias error over fluctuations in temperature and other external conditions, since the adjacent winding of lead 100a and lead 100b will cause the leads 100 to be subjected to substantially identical external conditions throughout their windings. Any stresses imparted on one of the leads 100, such as a change in temperature, will be similarly imparted on the other of the leads 100. Further, vibrations can cause small stresses in the leads 100, where a phase difference between the leads 100 could be introduced if only one of the leads 100 is stressed with respect to the other of the leads 100. By winding the leads 102 in adjacent fashion, any movement of the leads 100 due to these vibrations should occur in unison. Thus, the transmission characteristics of each of the leads 100a and 100b will change in a substantially similar manner in response to such stresses.

Figure 3C:
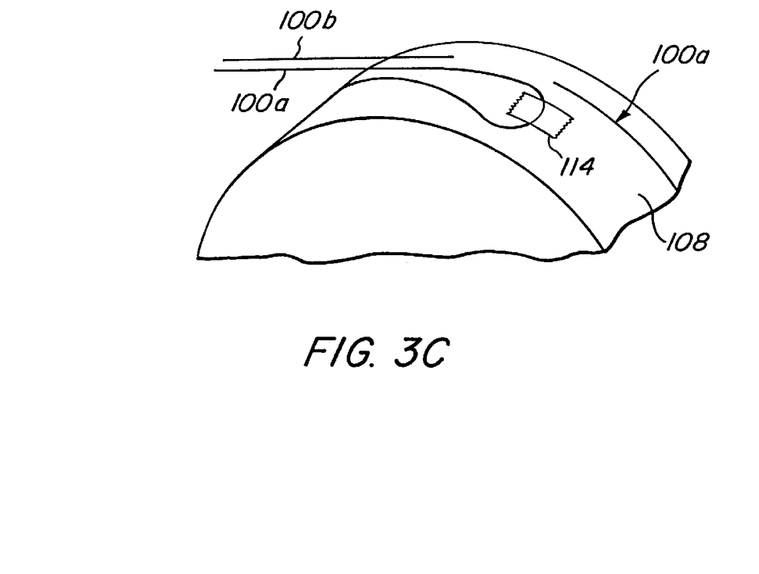
FIG. 3C is a partial enlarged perspective view illustrating a temporary adhesive applied to the loop formed in the fiber optic lead of FIG. 3B in order to hold the loop in place with respect to the fiber optic sensing coil.
Figure 4:
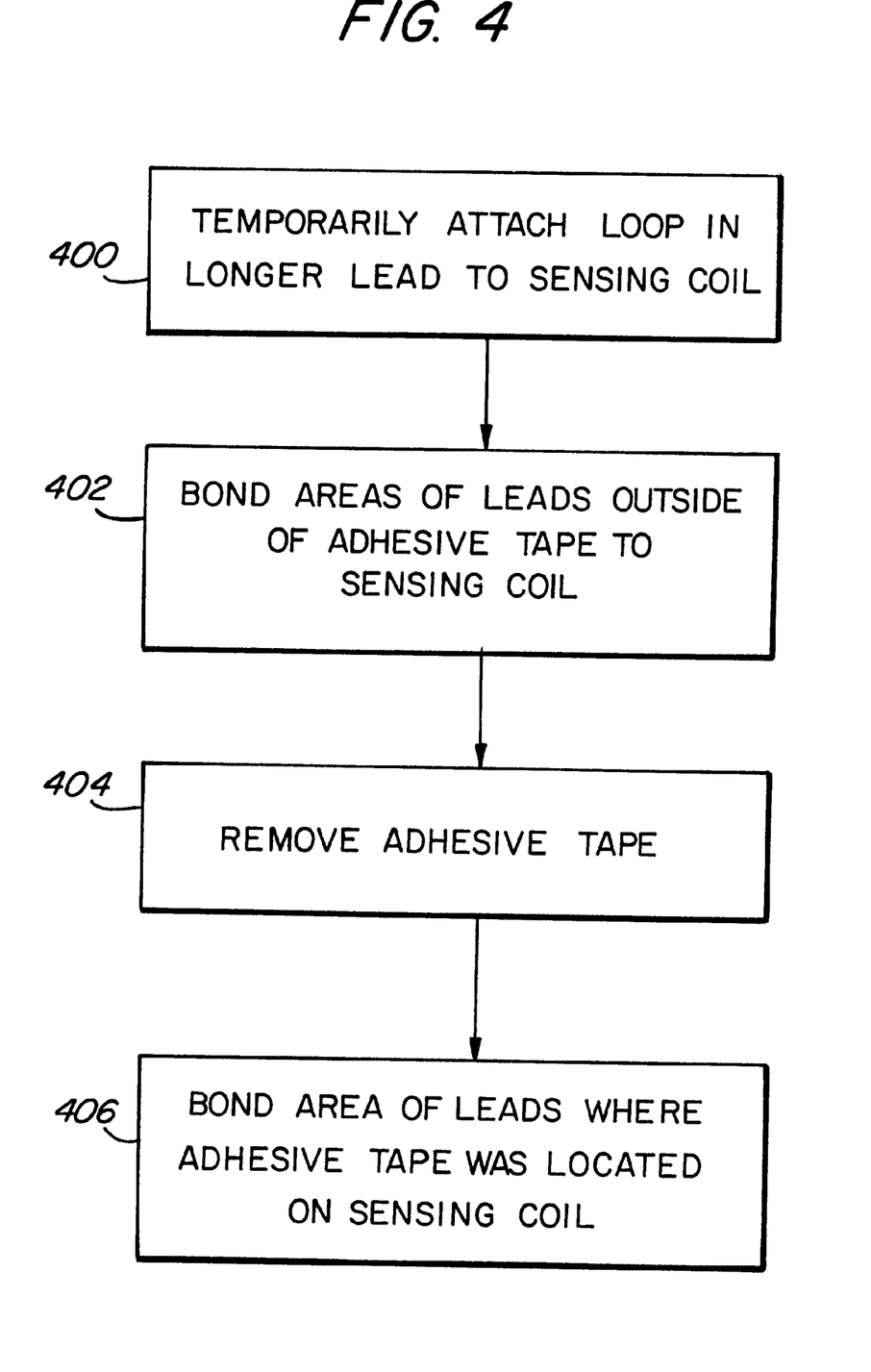
FIG. 4 is an operational block diagram of the steps of initially bonding the fiber optic leads to the fiber optic sensing coil in accordance with a preferred embodiment of the present invention.

Referring now to FIG. 4, the process for initially bonding the leads 100 to the sensing coil 102 is illustrated in an operational block diagram. In step 400, the loop 110 in the longer lead 100a is temporarily adhered to the sensing coil 102 using an adhesive tape 114 or other similar type of easily removable adhesive, as illustrated in FIG. 3C. The low modulus adhesive is then applied to the regions of the leads 100 surrounding the adhesive tape 114 which contact the outer circumference 108 of the sensing coil 102 in step 402. The adhesive is then cured in order to bond these regions of the leads 100 in place against the sensing coil 102. The adhesive tape 114 is then removed in step 404, and the low modulus adhesive is applied and cured in step 406 in the region of the loop 110 where the adhesive tape 114 was located. The low modulus adhesive then retains the leads 100 in place against the sensing coil 102, so that the leads 100 can be wound around the outer circumference 108 of the sensing coil 102 in a predictable and reliable manner.

Figure 3D:
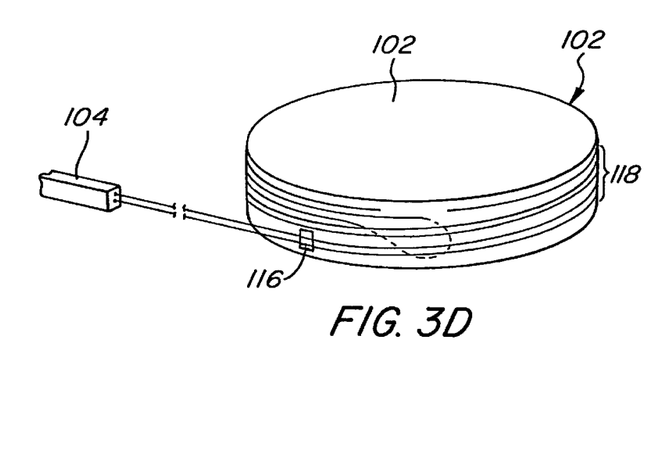
FIG. 3D is a perspective view of the fiber optic sensing coil of FIG. 1 with the fiber optic leads being completely wound in accordance with a preferred embodiment of the present invention.
Figure 5:
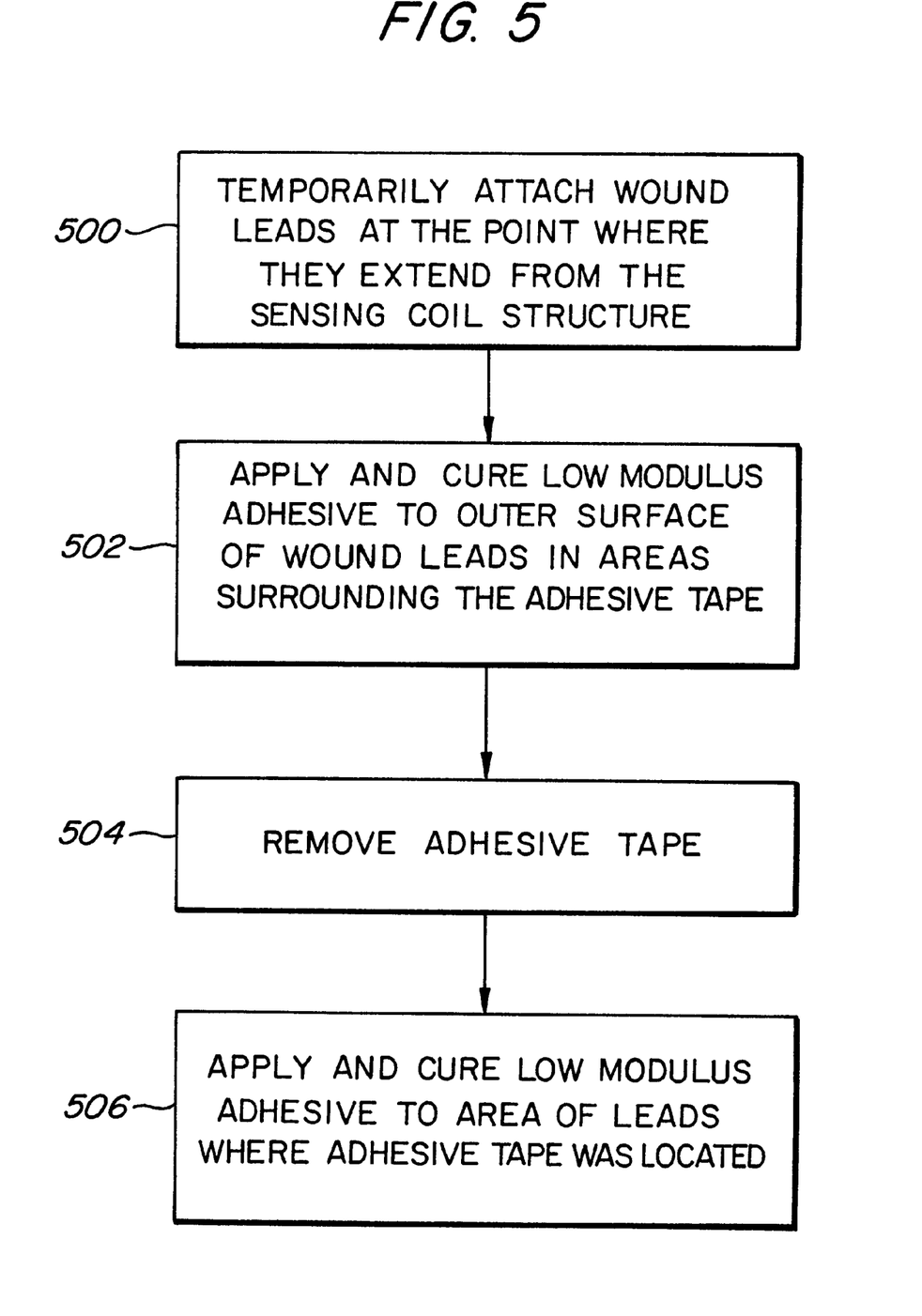
FIG. 5 is an operational block diagram of the steps of bonding the wound fiber optic leads to the fiber optic sensing coil in accordance with a preferred embodiment of the present invention.

The process for bonding the completely wound leads 100 to the sensing coil 102 structure is illustrated in an operational block diagram in FIG. 5. After being wound, the predetermined length 112 of the leads 100 extends from the wound sensing coil 102 structure to the integrated optics chip 104, as shown in FIG. 3D. The predetermined length 112 of each of the leads 100 is the same between the sensing coil 102 and the integrated optics chip 104. A length of adhesive tape 116 or other similar type of easily removable adhesive is then applied to the fiber optic leads 100 at the point where the leads 100 extend away from the outer circumference 108 of the sensing coil 102 in step 500. The outer surface 118 of the wound fiber optic leads 100 is then coated with a low modulus adhesive in the areas surrounding the adhesive tape 116 and cured in step 502. The adhesive tape 116 is then removed in step 504. In step 506, the low modulus adhesive is applied and cured in the region on the outer surface 118 of the leads 100 from where the adhesive tape 116 was just removed. This completes the dressing of the leads 100, where the entire outer surface 118 of the wound portion of the leads 100 is covered by the cured low modulus adhesive.

The low modulus adhesive used to bond the leads 100 to the sensing coil 102 allows some relative movement between the leads 100 and the sensing coil 102 in order to minimize the stress imparted on the leads 100 by external conditions. When an adhesive having too high of a modulus of elasticity is used to affix the fiber optic leads 100 to the sensing coil 102, the leads 100 are prevented from moving relative to the sensing coil 102. Any imputed stress on the sensing coil 102 structure is then exerted on the leads 100 themselves, resulting in the distortion of the shape of the leads 100 which affects the light propagation characteristics of the fiber optic leads 100. The manner of applying the low modulus adhesive to the leads 100 of the present invention stably retains the leads 100 against the sensing coil 102 while allowing miniscule movement of the leads 100 to help dissipate stress. The low modulus adhesive also allows the fiber optic leads 100 to be peeled through the low modulus adhesive to unwind the leads 100 during rework or repair operations without damaging the leads or the sensing coil 102. This allows the fiber optic leads to be easily and reliably reworked on a consistent basis.

As can be seen from the foregoing, an improved dressing for the leads of a fiber optic gyroscope sensing coil formed in accordance with the present invention allows the fiber optic gyroscope to function consistently over a variety of environmental conditions. Moreover, by forming an improved dressing for the leads of a fiber optic gyroscope sensing coil in accordance with the present invention, the attachment of the leads to the fiber optic gyroscope sensing coil can be repeatedly reworked without damaging either the leads or the fiber optic sensing coil.

In each of the above embodiments, the different structures of the improved dressing for the leads of a fiber optic gyroscope sensing coil of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of attaching a pair of fiber optic leads to a fiber optic gyroscope sensing coil, comprising the steps of:

arranging the pair of leads so that each of the leads initially extends in a circumferential direction around an outer circumference of the sensing coil opposite to the circumferential direction of the other lead;

extending a first lead of the pair of leads around at least a portion of the outer circumference of the sensing coil;

bending the first lead in order to reverse the circumferential direction of extension of the first lead so that both leads extend in the same circumferential direction;

initially bonding the pair of leads to the sensing coil;

winding the pair of leads in the same circumferential direction around the circumference of the sensing coil while substantially adjacent to each other until wound to a predetermined number of windings;

finally bonding an outer circumference of the wound portion of the pair of leads.

2. The method of claim 1, wherein the step of bonding the pair of leads to the sensing coil uses an adhesive having a low modulus of elasticity to perform said bonding.

3. The method of claim 2, wherein the step of bonding the pair of leads to the sensing coil comprises the steps of:

temporarily adhering the bent portion of the first lead to the outer circumference of the sensing coil using a temporary adhesive;

applying and curing the low modulus adhesive to an area of the leads contacting the outer circumference of the sensing coil surrounding the temporary adhesive;

removing the temporary adhesive from the bent portion of the first lead; and applying and curing the low modulus adhesive to the area of the first lead where the temporary adhesive was located.

4. The method of claim 2, wherein the temporary adhesive is a length of adhesive tape.

5. The method of claim 2, wherein the low modulus adhesive has a modulus of elasticity not greater than approximately 500 pounds per square inch.

6. The method of claim 2, where the low modulus adhesive is a UV light-curing adhesive.

7. The method of claim 1, wherein the step of bonding the outer circumference of the wound pair of leads uses an adhesive having a low modulus of elasticity to perform said bonding.

8. The method of claim 7, wherein the step of bonding the outer circumference of the wound pair of leads comprises the steps of:

temporarily adhering the wound pair of leads at a point where the winding is complete and the pair of leads extend away from the sensing coil using a temporary adhesive;

applying and curing the low modulus adhesive to an area of an outer circumference of the wound pair of leads surrounding the temporary adhesive;

removing the temporary adhesive from the wound pair of leads; and applying and curing the low modulus adhesive to the area of the wound pair of leads where the temporary adhesive was located.

9. The method of claim 8, wherein the temporary adhesive is a length of adhesive tape.

10. The method of claim 7, wherein the low modulus adhesive has a modulus of elasticity not greater than approximately 500 pounds per square inch.

11. The method of claim 7, where the low modulus adhesive is a UV light-curing adhesive.

12. An improved dressing for a pair of fiber optic leads of a fiber optic gyroscope sensing coil, comprising the steps of:

first and second leads having ends positioned on an outer circumference of the sensing coil, wherein the first and second leads extend from their respective ends in opposite circumferential directions from each other around the outer circumference of the sensing coil;

a bent portion formed in the first lead which reverses the circumferential direction of the first lead so that the first and second leads extend in the same circumferential direction around the outer circumference of the sensing coil at all points beyond the bent portion in the first lead;

an initial adhesive applied over the bent portion formed in the first lead and other areas of the first and second leads directly contacting the outer circumference of the sensing coil in order to initially bond the first and second leads to the sensing coil;

a predetermined number of windings of the first and second leads around the outer circumference of the sensing coil; wherein the first and second leads are wound in the same circumferential direction substantially adjacent to each other;

a final adhesive applied over an outer circumference of the windings of the wound first and second leads.

13. The improved fiber optic lead dressing of claim 12, wherein the initial adhesive and the final adhesive are adhesives having a low modulus of elasticity.

14. The improved fiber optic lead dressing of claim 13, wherein the low modulus adhesive has a modulus of elasticity not greater than approximately 500 pounds per square inch.

15. The improved fiber optic lead dressing of claim 13, wherein the low modulus adhesive is a UV light-curing adhesive.

16. The improved fiber optic lead dressing of claim 12, wherein after being wound the fiber optic leads extend from the fiber optic sensing coil to an integrated optics chip where phase differences between counter-propagating waves traveling through the fiber optic leads can be measured.

17. The improved fiber optic lead dressing of claim 12, wherein the initial adhesive is applied on the first and second leads by:

temporarily adhering the bent portion of the first lead to the outer circumference of the sensing coil using a temporary adhesive;

applying and curing a low modulus adhesive to an area of the leads contacting the outer circumference of the sensing coil surrounding the temporary adhesive;

removing the temporary adhesive from the bent portion of the first lead; and applying and curing the low modulus adhesive to the area of the first lead where the temporary adhesive was located.

18. The improved fiber optic lead dressing of claim 17, wherein the temporary adhesive is a length of adhesive tape.

19. The improved fiber optic lead dressing of claim 12, wherein the final adhesive is applied on the wound leads by:

temporarily adhering the wound pair of leads at a point where the winding is complete and the first and second leads extend away from the sensing coil using a temporary adhesive;

applying and curing a low modulus adhesive to an area of an outer circumference of the wound leads surrounding the temporary adhesive;

removing the temporary adhesive from the wound leads; and applying and curing the low modulus adhesive to the area on the wound leads from where the temporary adhesive was removed.

20. The improved fiber optic lead dressing of claim 12, wherein the first lead is longer than the second lead.

* * * * *

UNITED STATES PATENT AND TRADEMARK OFFICE
CERTIFICATE OF CORRECTION

PATENT NO. : 5,973,783  
DATED : October 26, 1999  
INVENTOR(S) : Goldner et al.

Page 1 of 1

It is certified that error appears in the above-identified patent and that said Letters Patent is hereby corrected as shown below:

<u>Column 7,</u>  
Line 41, delete "the steps of"

Signed and Sealed this

Twenty-third Day of April, 2002

Attest:

Attesting Officer

JAMES E. ROGAN  
*Director of the United States Patent and Trademark Office*